May 1, 1962 J. L. SNYDER III 3,032,755
MASKING DEVICE FOR RADAR MAPPING UNIT
Filed April 27, 1959 4 Sheets-Sheet 1

INVENTOR
John Lynn Snyder, III

BY Stevens, Davis, Miller & Mosher
ATTORNEYS

May 1, 1962    J. L. SNYDER III    3,032,755
MASKING DEVICE FOR RADAR MAPPING UNIT
Filed April 27, 1959    4 Sheets-Sheet 2
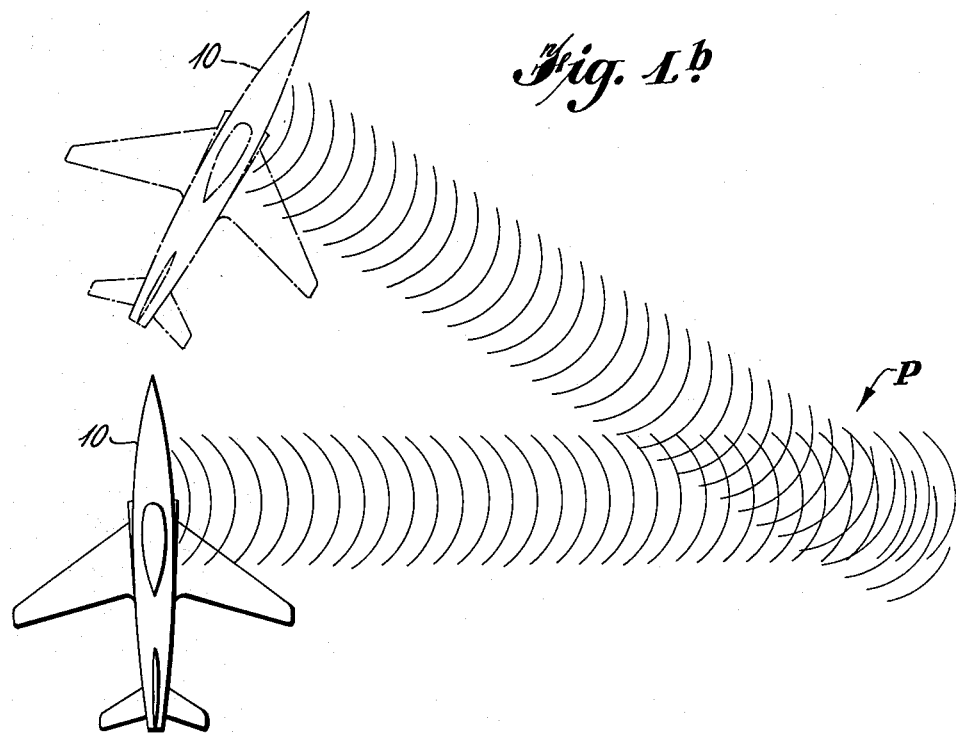
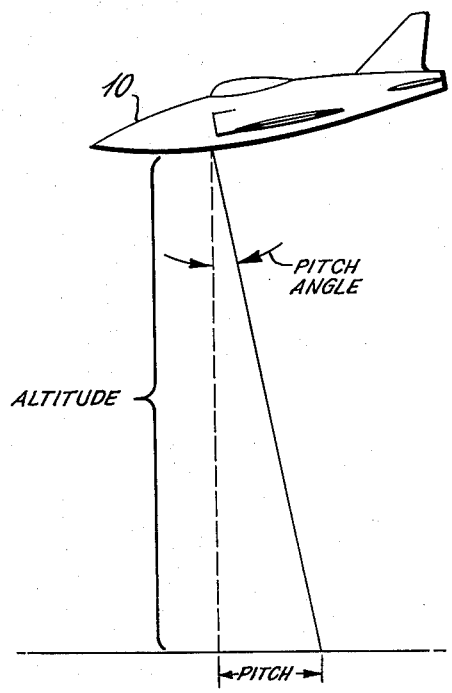
INVENTOR
John Lynn Snyder, III.
BY Stevens, Davis, Miller & Mosher
ATTORNEYS May 1, 1962 J. L. SNYDER III 3,032,755
MASKING DEVICE FOR RADAR MAPPING UNIT
Filed April 27, 1959 4 Sheets-Sheet 3

INVENTOR
John Lynn Snyder,III
BY Stevens, Davis, Miller & Mosher
ATTORNEYS

May 1, 1962 J. L. SNYDER III 3,032,755
MASKING DEVICE FOR RADAR MAPPING UNIT
Filed April 27, 1959 4 Sheets-Sheet 4
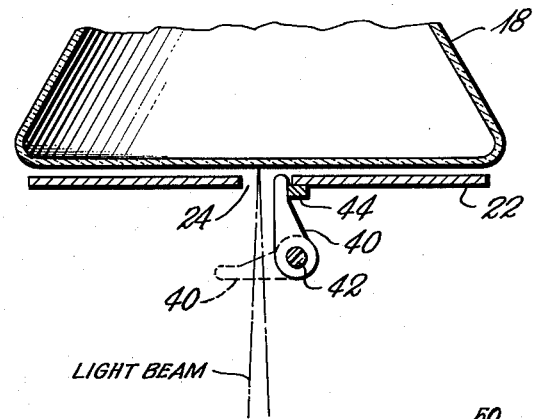
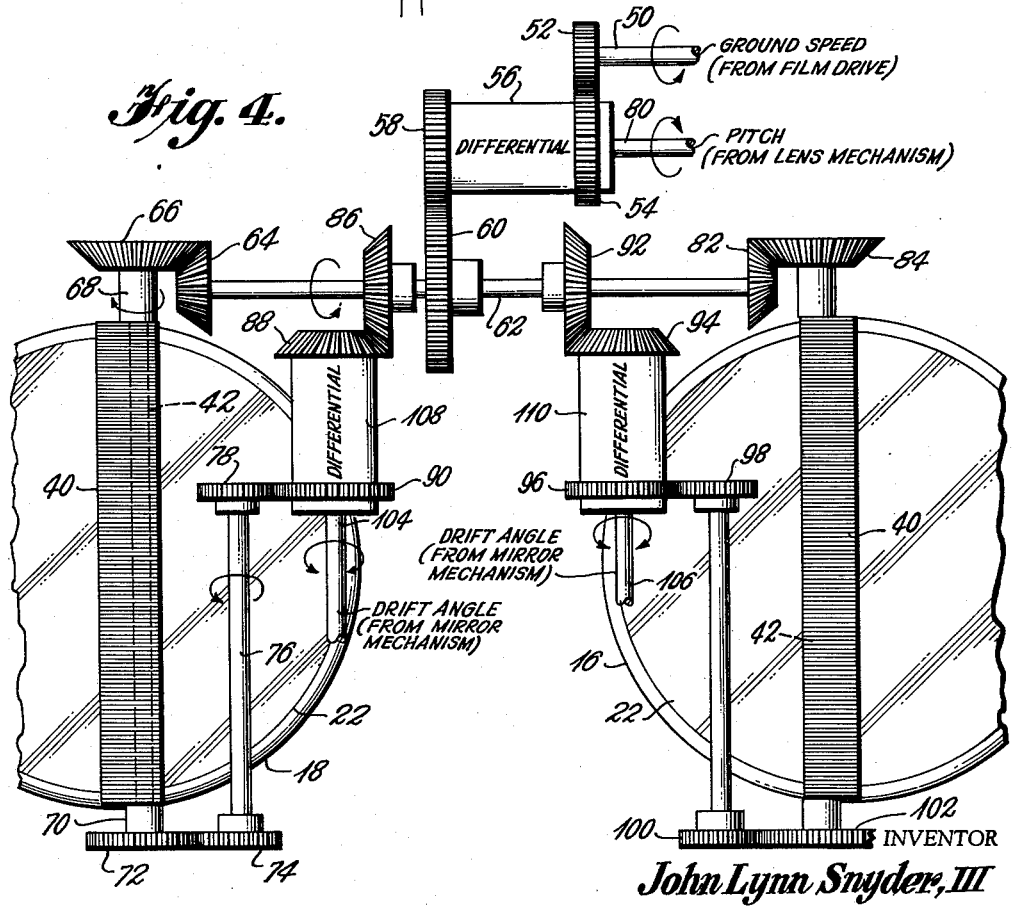
INVENTOR
John Lynn Snyder, III
BY Stevens, Davis, Miller & Mosher
ATTORNEYS United States Patent Office 3,032,755
Patented May 1, 1962

3,032,755
MASKING DEVICE FOR RADAR MAPPING UNIT
John L. Snyder III, Dallas, Tex., assignor to Texas Instruments Incorporated, Dallas, Tex., a corporation of Delaware
Filed Apr. 27, 1959, Ser. No. 809,054
10 Claims. (Cl. 343—5)

This invention relates to airborne ground mapping apparatus and more particularly to a mechanical masking device adapted to be utilized in conjunction with the apparatus to prevent the blurring of photographs as a result of pitching and yawing of the aircraft in which the mapping apparatus is carried.

Airborne ground mapping apparatus of the radar-optical type as presently known provide pitch and yaw corrections. This is essentially accomplished as regards yaw by controlling a mirror in the optical system to reflect the CRT trace of the radar system to the film in a fixed relationship with the ground being illuminated. Unfortunately, the mirror and its controls do not accomplish exact corrections and, hence, double exposures on the film do not overlay perfectly creating blur. As regards pitch, a lens in the optical system is controlled in somewhat the same manner. Again the corrections are not exact and double exposures cause blur.

The present invention overcomes the disadvantages of present apparatus by providing a mechanical means for cooperating with the mapping apparatus which operates to prevent double exposure and consequent blurring of photographs taken by an airborne radar camera. The masking device or shutter of the present invention comprises a twistable rod carrying a stack of thin, metal leaves mounted in front of a cathode ray tube on which the ground target trace appears. When the aircraft pitches in a direction to re-expose the ground target already photographed, the rod will rotate the stack of leaves to cover an optical opening through which the light rays from the cathode ray trace pass. When the aircraft yaws, the shutter will twist so as to cover a portion of the optical opening and thus prevent re-exposure of that portion of the ground target area which has been previously exposed or photographed.

It is a primary object of the invention to provide a shutter device for use in conjunction with airborne radar ground mapping apparatus which will prevent multiple exposure of the same ground target area and, thus, prevent the blurring of the photographs.

It is a further object of the invention to provide a simple, reliable, and inexpensive mechanical shutter which may be applied to radar ground mapping equipment.

The novel features that are characteristic of the invention are set forth with particularity in the appended claims. The invention itself, however, both as to its organization and its method of operation, together with additional objects and advantages thereof, will be best understood from the following description of a specific embodiment when read in connection with the accompanying drawings wherein like reference characters indicate like parts throughout the several figures and in which:

FIGURE 1 is a diagrammatic illustration in plan of an aircraft carrying a radar ground mapping camera to which the present invention may be applied;

FIGURE 1ª is a schematic diagram of the airborne camera with plan views of the cathode ray tube faces shown to illustrate partial ground traces corresponding to FIGURE 1;

FIGURE 1ᵇ is a diagrammatic illustration of an aircraft showing the result of yawing, the aircraft being shown in solid lines when in straight level flight and in broken lines when yawing to the right;

FIGURE 1ᶜ is a diagrammatic illustration showing pitch;

FIGURE 3 is a diagrammatic plan view partially showing one cathode ray tube and its shutter mechanism; and FIGURE 4 is a diagrammatic front elevational view of the pair of cathode ray tubes equipped with the shutter mechanism and showing a gear system for its operation.

Figure 1:
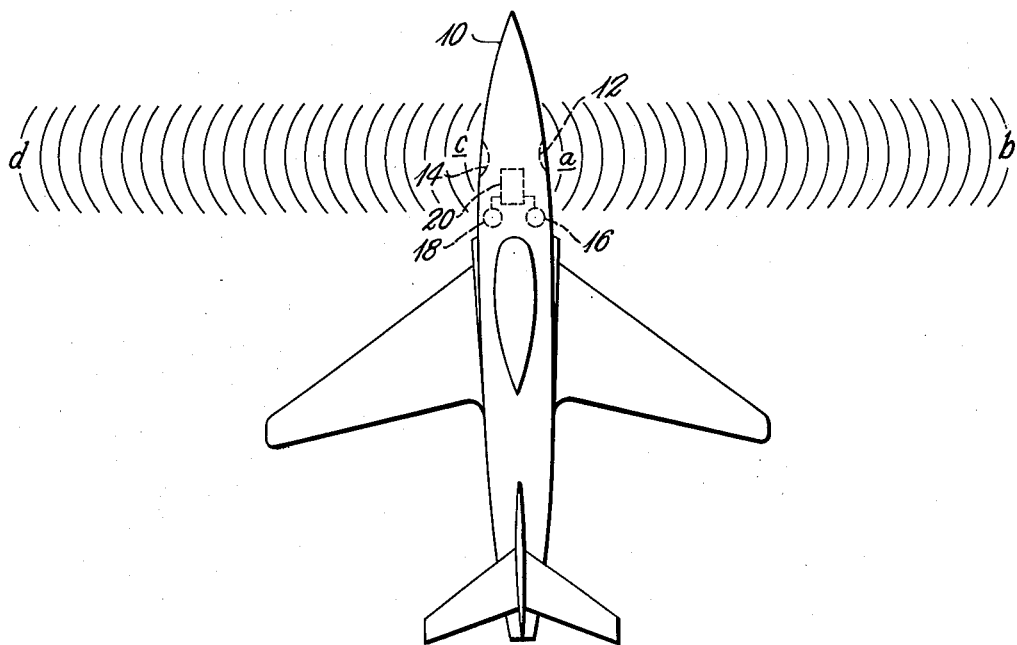
Figure 1A:
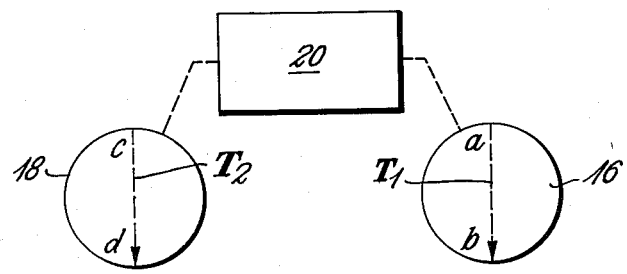

Referring now to the drawings, FIGURE 1 schematically illustrates aircraft 10 equipped with a radar camera mapping apparatus 20 having a pair of radar antennas 12 and 14 for directing the radar beam toward the ground target areas to each side of the aircraft in flight. As indicated in the figure, antenna 12 would illuminate an area on the ground between points a and b, while antenna 14 would illuminate an area between c and d. While the plane 10 is in level flight, the pair of cathode ray tubes 16 and 18 in camera 20, shown diagrammatically in FIGURE 1ª, would receive radar return signals resulting in vertical traces $T_1$ and $T_2$ corresponding, respectively, to ground lines a—b and c—d. These are exposed on the camera film. As the flight continues, successive exposures are made of ground traces on each side of the line of flight.

There are essentially two factors to take into account if double exposure of the film is to be prevented, namely, pitch and yaw of the aircraft. Pitch is illustrated in FIGURE 1ᶜ and is defined herein as the altitude of the aircraft times the tangent of pitch angle. Pitch will only become a significant factor if the forward speed of the aircraft is not great enough to compensate for it. Under such circumstances, the antenna ground illuminating and reflected beams a—b and c—d would move backwardly of the plane to ground target areas previously illuminated and exposed or photographed. Consequently, unless such re-exposures are compensated for in the camera mechanism to fall exactly on the previous exposures, the photographs will be blurred.

The effect of yaw is illustrated in FIGURE 1ᵇ. Again, the speed of the aircraft is an important consideration. As noted from the figure, the aircraft 10 is yawing toward the right and the paths of the radar beam illuminating ground areas, for the two positions shown, intersect at point P. Hence, only areas to the right of point P will be double exposed. The distance between the aircraft and point P is dependent upon the forward speed of the aircraft and its rate of yaw. Point P may be out of the range of the mapping radar, in which case no corrections or adjustments need by made. If point P is in radar range, then provision must be taken to prevent double exposure on the film of areas to the right of point P.

Figure 2:
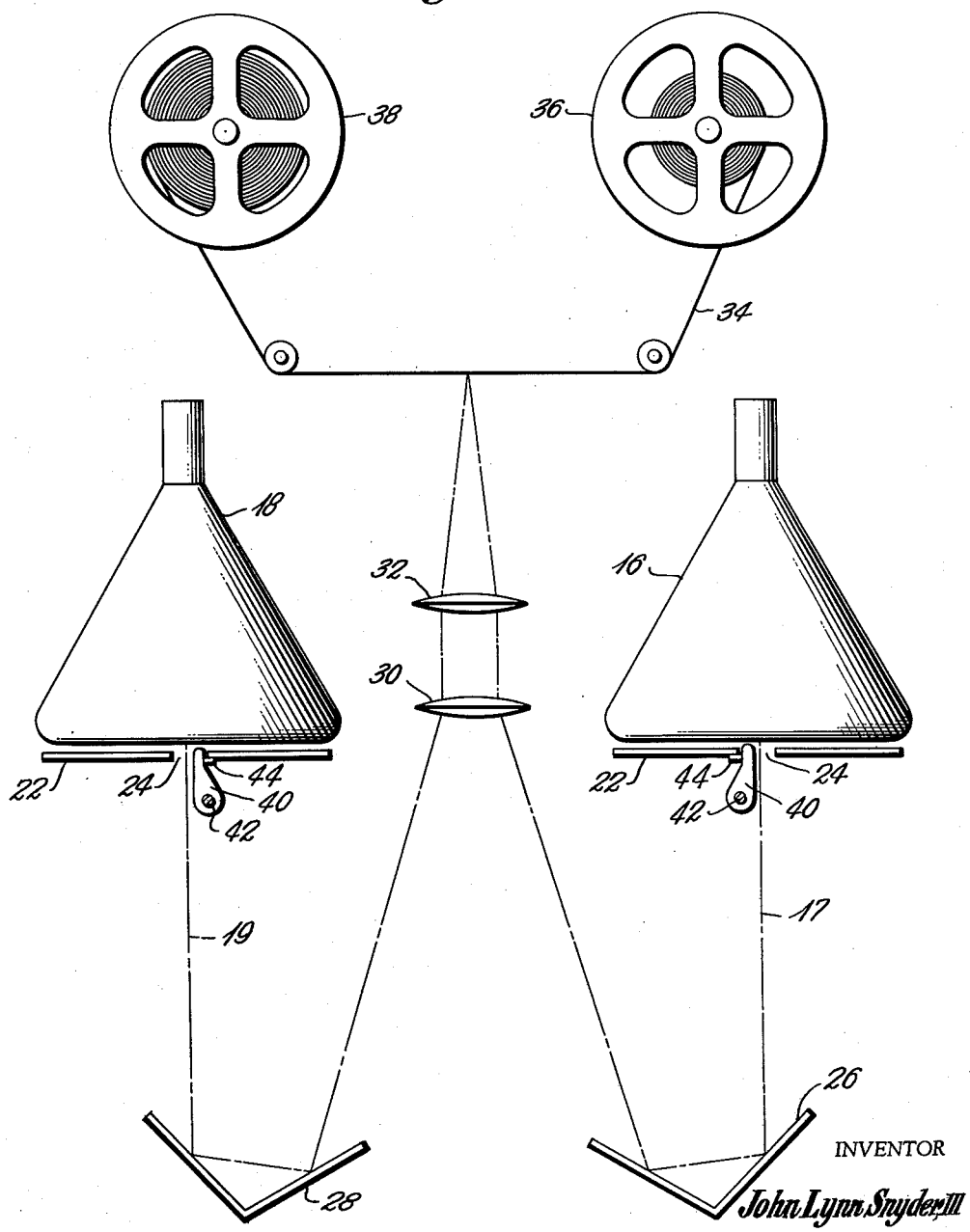
FIGURE 2 is a diagrammatic sketch illustrating the paths of light from the cathode ray tube traces through the shutter mechanism of the instant invention to the film in the airborne camera.

The present invention contemplates the use of a simple and reliable mechanical shutter to prevent re-exposure of film in the airborne camera under pitch and yaw conditions of the aircraft. A preferred embodiment of such a shutter is partially shown at 40, FIGURE 2, in relation to parts of a radar camera mapping apparatus. The face of each cathode ray tube 16 and 18 is covered with an optical mask 22 having a vertically elongated opening 24 for passage of light rays 17 and 19 from the vertical ground traces. It must be recognized that the mask 22 is not essential, although its use has been found to be desirable. The ground trace will normally be centered behind the shutters. The function of the mask 22 is to prevent light rays reaching the film which originate from other than a properly located ground trace. The shutters, whose uppermost elements are indicated at 40, are placed in front of optical openings 24 so as to close or partially close these openings to the passage of light from the cathode ray tube traces under pitch and yaw conditions. The light rays from the traces on the cathode ray tubes are reflected by a mirror system, partially shown at 26 and 28, into a lens system comprising lenses 30 and 32 which focus the trace images on film 34. The mirrors and lenses are constructed and arranged to project the trace images on the film in an end-to-end relationship. Thus, the image from CRT 18 will lie on the upper half of film 34, and the image from CRT 16 will lie on the lower half of film 34. The film 34 may be carried on reels 36 and 38. One of the reels is driven at a rate such that the film moves at a rate proportional to the ground speed of aircraft 10. In the camera apparatus, an iris is preferably used to adjust the intensity of the light source to correspond to the ground speed of the aircraft. This presumes the illuminated beam on the ground is moving with the same velocity as the aircraft. The exact construction and arrangement of the mirror and lens system, the camera and film system, and the radar are not part of the present invention and need not be further described in detail. Suffice it to say that the mechanical shutter of the instant invention may be utilized with radar camera apparatus of different types which may or may not be gyro or otherwise compensated for pitching and yawing conditions of the aircraft.

A detailed description of the shutter mechanism will now be made with reference particularly to FIGURES 3 and 4. As previously stated, each cathode ray tube 16 and 18 is covered with an optical mask 22 having an elongated or rectangular light passage opening 24. Adjacent one side of each opening 22 is placed a rod or stop member 44. A second rod 42 of flexible material such as nylon is journaled in bearings 68 and 70 in front of each stop 44. A stack of thin leaves 40 is mounted on each nylon rod 42 in frictional gripping engagement therewith so as to turn with the rod. The thickness of the leaves 40 may be in the order of one hundredth of an inch. When the rod 42 turns clockwise as viewed in FIGURE 3, the leaves 40 strike stop 44, slip on rod 42, and are prevented from further turning movement in this direction. When the rod 42 is turned counterclockwise, the leaves 40 take positions partially or completely obstructing the passage of light through opening 24 as shown in broken lines in FIGURE 3. When the rod 42 is twisted, as for example if the bottom of the rod is turned counterclockwise through a greater arc than the top of the rod, a number of the leaves at the bottom of the rod will be turned to cover the optical opening 24, while those in the center may only partially obstruct the opening, and those at the top may remain against or close to the stop 44 leaving the upper end of passage 24 uncovered.

The rods 42 may be turned or twisted by use of any suitable mechanism such as gears or pulleys. FIGURE 4 illustrates one such mechanism utilizing gears. The drive shaft 50, normally rotating in the direction of the arrow, turns the gear 52 at a rate in proportion to the ground speed of the aircraft. The drive for shaft 50 may be taken from the film drive of the camera by a gear train not shown. Gear 52 rotates the upper end of one rod 42 in a clockwise direction through a gear train including gears 54, 58, 60, shaft 62, and beveled gears 64 and 66. The upper end of the second rod 42 is similarly driven in a counterclockwise direction by shaft 62 and beveled gears 82 and 84. The shaft 62 imparts rotational drive in the same direction, respectively, to the bottoms of the rods 42 through the gear train 86, 88, 90, 78, 74, and 72 on one side, and the gear train 92, 94, 96, 98, 100 and 102 on the other side. A shaft 80, which may rotate in either direction in accordance with the pitch of the aircraft, drives a differential gear 56 so as to either augment, oppose or reverse the rotation of the gear 58 effected by the shaft 50. The drive shaft 80 may be driven by a servo-motor or other automatic means, not shown, and preferably follows the pitch of the lens mechanism of the camera. The drive shafts 104 and 106 impart rotation in either direction to the differential gears 108 and 110, respectively. Such rotation corresponds or is in proportion to the drift or yaw angle of the aircraft and is preferably taken by a servo-motor or other suitable automatic means from the mirror mechanism of the camera. The differentials 108 and 110 each may augment, oppose or reverse the rotation of the lower ends of rod 42 in accord with the drift angle through interaction with gears 88—90 and 94—96.

In operation of the described mechanical shutter under condition of level flight of the plane, both optical openings 24 in the cathode ray tube masks are open so that light from the ground traces is permitted to pass into the camera and expose the film to photograph the ground target areas on both sides of the plane. Opening of the light passages 24 is accomplished by the rotational force applied by shaft 50 to turn both ends of each rod 42. The rods 42 rotate in opposite directions carrying the stacks of leaves 40 against stops 44. Regardless of how slow the plane goes, the shutters cannot come off the stops unless there is a change in yaw or pitch.

When the aircraft altitude changes causing the nose to move downwardly and the forward speed of the aircraft is not great enough to compensate, both radar antennas move to detect ground target areas rearwardly of the plane and previously photographed. The shaft 80, reflecting the pitch through differential gear 56, reverses the rotation of the rods 42 and carries the leaves 40 into the paths of light rays in passages 24. This condition with complete obstruction of the passages is shown in FIGURE 4.

When the aircraft altitude changes causing the nose to move upwardly, both radar antennas illuminate the ground forwardly of the plane and the pitch drive shaft 80 augments the rotation of the rods 42 in their original or normal direction to maintain the shutter leaves 40 against the stops 44 and the light passages 24 unobstructed.

When the aircraft yaws to the right, see FIGURE 1b, and point P is within range, double exposure is corrected as follows.

The drift angle shaft 106 turns in a direction to reverse the rotation of gear 102 and twist the rod 42 so that the lower leaves 40 turn into the path of the ground trace ways to partially block out the rays. The left drift angle shaft 104 turns in such direction as to augment the rotation fo gear 72 in its normal, clockwise direction. This holds the light passage 24 for cathode ray tube 18 completely open from top to bottom. In this manner, that portion of the ground which has been previously photographed is prevented from again exposing light from tube 16 to the film. However, the complete trace on tube 18 continues to be exposed to the film since it represents ground target area not previously photographed. When the aircraft yaws to the left, a similar action of the shutter mechanism takes place but in reverse. In such instance, the drift angle shaft 104 imparts a reverse rotation through differential gear 108 to the gear 72 which twists the rod 42 in front of tube 18 to partially close its optical opening 24. The drift angle shaft 106 turns in a direction which augments the rotation of gear 102 in its normal direction so that the optical opening in front of cathode ray tube 16 remains open.

It is evident that the use of the present invention enables only the first pass over ground to be filmed and succeeding passes of the radar illumination are blanked out resulting in a high resolution of the camera photographs obtained. For complete once only coverage, the desired blanking does not necessarily cover a full cathode ray tube trace, but may only blank a portion of the trace. The boundary lines that separate the filmed area from the unfilmed area is generally a straight line or a simple geometrical figure. The shutter leaves 40 are operated to move and accurately conform to the boundary line of the filmed area by the twisting of the rod upon which they are mounted. The angular displacement of the rod during twisting at the 50 mile range end of the trace corresponds to the linear displacement of the antenna beam at that range, while angular displacement of the rod at the 3 mile range of the trace, for example, corresponds to the linear displacement of the antenna beam at the 3 mile range.

Although a certain specific embodiment of the invention has been shown and described, it is obvious that many modifications thereof are possible. The invention, therefore, is not to be restricted except insofar as is necessitated by the prior art and by the spirit of the appended claims.

What is claimed is:

1. A device for preventing double exposure of a radar camera borne by an aircraft comprising a segmented shutter mounted for rotation to cover and uncover the ground target trace of a cathode ray tube, means for entirely opening said shutter when the aircraft is in normal flight, means for entirely closing said shutter when the aircraft pitches in a manner to re-expose the same target area, and means for partially closing said shutter when the aircraft yaws in a manner to re-expose the same target area.

2. A device according to claim 1 wherein said segmented shutter comprises a twistable rod having frictionally mounted thereon a stack of eccentric washers adapted to turn with said rod so as to completely open the light passage, a portion of said stack of washers turning when the rod twists to partially close the light passage.

3. A cathode ray tube masking device for use with airborne radar camera ground mapping apparatus, comprising a twistable rod journaled in front of and parallel to a trace resulting from a ground reflected radar signal, a stack of leaves frictionally mounted on said rod to turn therewith and cover said trace, a stop member to prevent further turning of said leaves when said trace is uncovered, means operable to turn said rod in one direction at a rate proportional to the ground speed of the aircraft carrying said apparatus, and means operable in proportion to the pitch of said camera mapping apparatus to reverse the direction of rotation of the rod and swing said leaves to cover said trace.

4. A cathode ray tube masking device in accordance with claim 3 wherein said means operable in proportion to the pitch of said camera mapping apparatus includes a differential.

5. A cathode ray tube masking device, for use with airborne radar camera ground mapping apparatus, comprising a twistable rod journaled in front of and parallel to a trace resulting from a ground reflected radar signal, a stack of leaves frictionally mounted on said rod to turn therewith and cover said trace, a stop member to prevent further turning of said leaves when said trace is uncovered, means operable to turn said rod to one direction at a rate proportional to the ground speed of the aircraft carrying said apparatus, means operable in proportion to the pitch of said camera mapping apparatus to reverse the direction of rotation of the rod and swing said leaves to cover said trace, and further means to twist said rod in reverse direction of rotation in proportion to the yaw motion of said camera apparatus.

6. A cathode ray tube masking device according to claim 5 wherein said further means to twist said rod comprises a gear train including a differential gear whose rotation is controlled by the drift angle of the camera mapping apparatus.

7. A shutter for preventing exposure of an airborne ground radar mapping camera under pitch and yaw conditions comprising a flexible rod journaled at both ends and parallel to an elongated light passage, a stack of thin leaves frictionally mounted on said rod, a stop member parallel to said rod, and drive means at each end of said flexible rod for rotating and twisting the rod, whereby upon rotation of said rod in one direction, the leaves are turned against said stop member to uncover the light passage and retained thereagainst while the rod continues to rotate, and upon application of different turning forces to the rod ends, in the same and in opposite directions, the rod is twisted to move the leaves to partially cover said light passage.

8. In combination with an airborne radar camera ground mapping apparatus utilizing a pair of cathode ray tubes, a mechanical device for preventing double exposure under pitch and yaw conditions of the aircraft, comprising a pair of segmented shutters mounted on twistable rods to open and close an elongated optical opening in front of each cathode ray tube, a gear train including a differential gear for turning both ends of each shutter rod to rotate the rods each in a given direction, means responsive to the pitch angle of said airborne camera and connected through said differential gear to reverse rotation of said shutter rods, a pair of additional differential gears in said gear train, and means responsive to the drift of said airborne camera connected through said pair of differential gears to reverse the rotation of one end of each of said shutter rods.

9. In combination with an airborne radar camera ground mapping apparatus utilizing a cathode ray tube, a mechanical device for preventing double exposure under pitch and yaw conditions of the aircraft, comprising a segmented shutter mounted on a twistable rod to open and close an elongated optical opening in front of the cathode ray tube, a gear train including a differential gear for turning both ends of the shutter rod to rotate the rod in a given direction, means responsive to the pitch of said airborne camera and connected through said differential gear to reverse rotation of said shutter rod, an additional differential gear in said gear train, and means responsive to the drift angle of the airborne camera connected through said additional differential gear to reverse the rotation of one end of said shutter rod.

10. A device for preventing double exposure of a radar camera borne by an aircraft comprising a shutter arranged to cover and uncover the ground target trace of a cathode ray tube and means responsive to changes in the attitude of the aircraft and further responsive to the ground speed of the aircraft to operate said shutter to cover the portions of said ground target trace representing previously exposed target areas.

No references cited.